United States Patent Office 3,131,994
Patented May 5, 1964

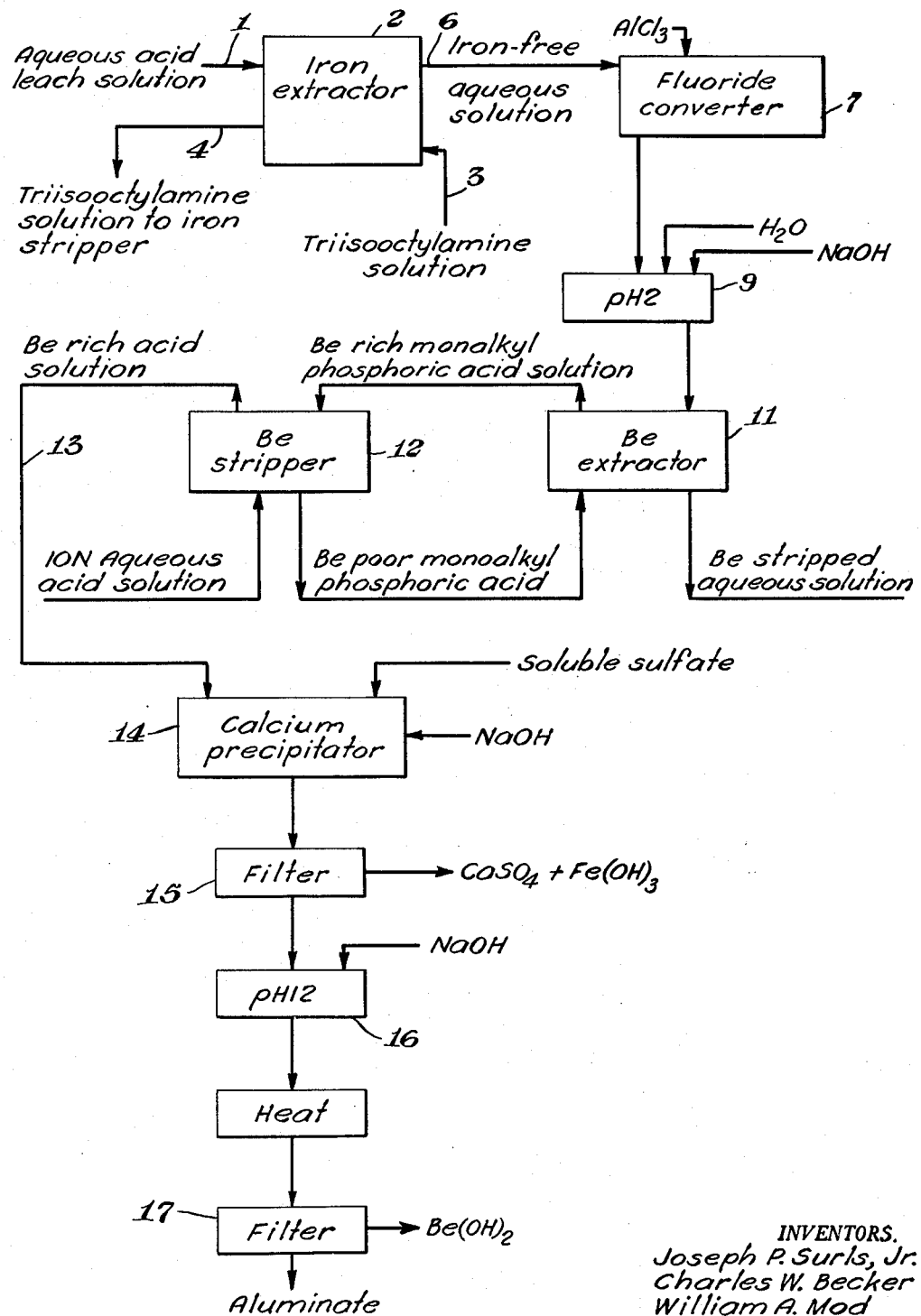

3,131,994
RECOVERY OF BERYLLIUM VALUES
Joseph P. Suris, Jr., Walnut Creek, Calif., and Charles W. Becker, Angleton, and William A. Mod, Lake Jackson, Tex., assignors to The Dow Chemical Company, Midland, Mich., a corporation of Delaware
Filed Dec. 7, 1961, Ser. No. 157,625
16 Claims. (Cl. 23—23)

This invention pertains to the separation and recovery of beryllium from an aqueous leach solution of beryllium ore.

Numerous processes are used for the recovery of beryllium from its ore. The ore may be directly digested with an acid or first sintered and reacted with certain constituents and then leached with an acid or salt solution to recover the beryllium. Whatever method is used, an aqueous solution is obtained which contains beryllium and many other ions and cations as impurities. For example, a solution obtained may contain a certain amount of calcium, aluminum, iron, sodium and potassium and have anions of chloride, fluoride, sulfate or silicofluoride. While the beryllium is in solution, its concentration may be very low compared to the total concentration of the impurities. The concentration of the impurities may be two to ten times greater than the beryllium content. Thus, the recovery of beryllium from the aqueous solutions is a difficult and a costly process.

It is therefore an object of this invention to provide an improved process for the recovery of beryllium from an aqueous leach solution. A further object is to provide a process of treating an aqueous leach solution to thereby obtain an aqueous solution of increased concentration of beryllium. A still further object is to provide an improved process for removing the iron impurity which may be found in an aqueous solution.

The above and other objects are attained according to the invention by reacting the free-fluoride ions found in the aqueous solution with other elements to convert the free-fluoride ions to complex ions, such as aluminum fluoride, silicofluoride, or fluoroborate ions. The pH of the resulting solution is adjusted in a range of from 1 to 5 and then the solution is contacted with an alkylphosphoric acid to thereby extract the beryllium in a resulting alkylphosphoric acid phase. The alkylphosphoric acid phase containing the beryllium is contacted with a mineral acid to strip the beryllium from the alkylphosphoric acid. The beryllium is thus obtained in an aqueous acid solution at a greatly enriched concentration and separated from most of the other constituents found in the original leach solution except iron. The resulting solution, if desired, may be contacted with a di- or trialkylamine having alkyl substituents of from 5 to 19 carbon atoms, such as triisooctylamine and didodecylamine to extract the iron. The iron can also be removed by treating the solution with the alkylamine prior to contacting the solution with the alkylphosphoric acid.

While with the alkylphosphoric acid and alkylamine extraction steps beryllium may be converted to a solution containing substantially only beryllium, the extraction steps can also be used to pretreat aqueous leach solutions containing fluorides in a process to recover the beryllium as beryllium hydroxide. A process to recover beryllium from solutions by precipitating the beryllium as beryllium hydroxide by controlling the pH is well known. However, in the application of this process to leach solutions obtained from fluoride-containing ores only a minor portion of the beryllium may be recovered from the solution by this process. By employing the alkylamine and alkyl phosphoric steps it is possible to concentrate the beryllium obtained by employing one or two contact stages and free the beryllium from the fluoride content. By this process the solution is concentrated considerably in the beryllium content and the other constituents are removed so that they are present only in minor proportions and may be readily further separated by employing hydroxide precipitation method by controlling the pH.

A process where the extraction steps are used to remove the iron and free the beryllium from the fluoride content by use of alkylphosphoric acid extraction steps is shown in the flow sheet in FIGURE 1. In FIGURE 1, an aqueous leach solution, such as obtained upon the digestion of beryllium ore with a mineral acid as sulfuric, hydrochloric, and hydrofluoric or an acid leach solution resulting from the leaching of the ore sintered with particular constituents to render the beryllium more soluble, is charged by means of line 1 to an iron extractor 2 where the iron is extracted, for example, by triisooctylamine. The triisooctylamine, generally as a solution in a water immiscible organic diluent, is introduced into the iron extractor by means of line 3 where it is contacted with the aqueous solution. In contacting the aqueous leach solution, the iron is extracted by the triisooctylamine solution and the iron-rich triisooctylamine solution is passed from the iron extractor through line 4 to an iron stripper (not shown) where the iron is removed and the triisooctylamine solution recycled. While only one countercurrent extraction stage is shown in the diagram, it is apparent that the various known methods of effecting a liquid-liquid extraction may be used.

The iron-free aqueous solution by means of line 6 is then passed to a fluoride converter 7 where a soluble aluminum salt is added in sufficient proportions to combine with all of the free-fluoride ions present. The aqueous solution is then transferred to vessel 9 where water and a basic compound, such as sodium hydroxide, are added to dilute the solution and adjust the alkalinity to a pH of 2. After the pH of the solution is adjusted, the solution is passed to beryllium extractor 11. To the beryllium extractor an alkylphosphoric acid, generally in a water immiscible organic solvent, is charged where the phosphoric acid contacts the pH adjusted aqueous solution and extracts the beryllium. The beryllium-rich phase of the alkylphosphoric acid is discharged from beryllium extractor and passed to a beryllium stripper 12 where the beryllium is stripped from the alkylphosphoric acid. The alkylphosphoric acid extractant is recycled back to the beryllium extractor. In the beryllium stripper a mineral acid solution, such as HCl, HBr, $H_2SO_4$, and $HNO_3$, is used to strip the beryllium from the rich alkylphosphoric acid phase. In stripping the beryllium from the alkylphosphoric acid solution, an aqueous acid solution of beryllium is again obtained but having a concentration of around 12 percent as compared to the original solution which may contain less than 0.5 percent. This beryllium aqueous acid solution obtained is then further processed to recover the beryllium as beryllium hydroxide.

From beryllium stripper 12, the beryllium-rich acid solution is passed by means of line 13 to a calcium precipitator 14 where the calcium is removed. To the calcium precipitator, a soluble oxalate or a sulfate is added to react with the calcium. Sodium hydroxide is also added to adjust the pH of the solution to a pH in the range of 3.5 to 4 to precipitate the calcium. From the calcium precipitator, the solution or slurry is passed to filter 15 where the insoluble salt is removed. The filtrate from filter 15 is passed to tank 16 in which the pH of the filtrate is adjusted to 11 to 13. In adding a basic material to the filtrate to obtain the desired pH, the beryllium and the aluminum precipitate as hydroxides at a pH of 4 to 5. However, by increasing the pH to 11 to 13 the beryllium and aluminum go back into solution as beryllate and aluminate, respectively. The alkaline solution is then heated to boiling which results in the beryllium precipitating as a crystalline beryllium hydroxide, while the aluminum remains in solution as aluminate. Thus, after heating, the solution is passed to filter 17 where the beryllium hydroxide is recovered.

Leach solutions containing fluoride ions may result from the leaching or processing of an ore containing calcium fluoride, or the ore may have been sintered with a fluoride prior to leaching.

Prior to the extraction of the beryllium from these solutions with the alkylphosphoric acid, it is essential that the aqueous leach solution be substantially free of free-fluoride ions. Conversion of the free-fluoride to complex fluoro-aluminum ions may be effected by addition of an aluminum salt, such as aluminum chloride, aluminum oxide, aluminum sulfate, aluminum nitrate, and aluminum silicate. Alternatively, conversion of the fluoride to complex fluoride anions such as silicofluoride anions or fluoroborate anions may be effected by the addition of a soluble silicate or oxygen-containing boron compound such as boric acid, borax, and the alkali metal borates and metaborates. While not essential it may be desirable at times to remove the complexed fluoride ions by precipitation prior to the beryllium extraction step. For example by the addition of a soluble potassium salt the silicofluoride may be precipitated and thus removed.

To effect the beryllium extraction with alkyl phosphoric acid, it is essential that the pH of the solution be less than 5, preferably in the range of 1.8 to 3. When the pH is below 1, less favorable equilibrium conditions are obtained for the recovery of beryllium, while above a pH of 5, hydroxides precipitate which result in the formation of emulsions. The adjustment of the pH is generally accomplished by the addition of a basic material. The common alkali metal hydroxides as well as the alkali metal carbonates and oxides may be used.

In addition to the adjustment of the pH the leach solution is generally diluted so that it contains from 0.5 to 5 weight percent of dissolved salts, especially if a chloride solution is used. Although the concentration of the dissolved salts of other than chloride solutions, such as sulfate or nitrate may be as high as 20 percent, a greatly improved separation is also obtained with these other solutions if the concentration is maintained below 5 weight percent.

The mono- or dialkylphosphoric acids having alkyl substituents of from 5 to 19 carbons, such as isoamyl, 2-ethylhexyl, dodecyl, heptadecyl, and nonadecyl may be used to extract the beryllium. The alkylphosphoric acids having alkyl substituents of from 10 to 14 are generally preferred.

The various known techniques used in liquid-liquid extraction are applicable to this extraction. Generally, the alkylphosphoric acid is dissolved in a water immiscible diluent. Illustrative examples of diluents which may be used are aliphatic hydrocarbon solvents, such as mineral spirits, kerosene, light gas oils and the like; aromatic solvents, such as benzene, toluene, and xylene; and various petroleum fractions containing a mixture of aliphatic and aromatic compounds. The concentration of the alkylphosphoric acid in the diluent may be widely varied. From 0.5 to 30 volumes of the diluent per one volume of the alkylphosphoric acid may be used. The extraction is most conveniently carried out in a continuous countercurrent multistage contact using from 0.6 to 3.0 volumes of the alkylphosphoric acid mixture per volume of the leach solution. Usually a one or two stage extraction is sufficient.

Upon contacting the leach solution with the alkylphosphoric acid in the water immiscible diluent, two phases are obtained with the alkylphosphoric acid being in the organic phase and extracting the beryllium. The resulting two phases are separated and the aqueous leach solution phase being substantially free of beryllium may be discharged to waste, further processed for recovery of other constituents, or recycled to be used as make-up solution in treatment of more ore. The organic alkylphosphoric acid phase containing the beryllium is contacted with a mineral acid to strip the beryllium from the extractant. Mineral acids, such as hydrochloric, hydrofluoric, hydrobromic, nitric, and sulfuric may be used. Generally a 4 to 12 normal acid solution in slight excess of the stoichiometric amount is used. It is preferred to use a 6 to 8 N acid solution. Since the extractant or the alkylphosphoric acid mixture is usually recycled to be contacted with more aqueous leach solution, complete recovery of the beryllium from the solvent or extractant is not required.

The acid solution obtained as a result of the stripping of the alkylphosphoric acid may contain beryllium in an amount of over 10 percent. If one or two contact stages are used, the solution will contain impurities but at a greatly reduced level. This solution may be further processed to recover the beryllium as beryllium hydroxide.

If the iron has not been previously removed, the beryllium rich solution may be contacted with the alkylamine to extract the iron. Iron is generally found in most leach solutions. Most of the solvents which will extract iron will also remove a considerable portion of the beryllium. Thus the di- and trialkylamines having 5 to 19 carbon atoms, especially triisooctylamine, are unusual in this respect in that substantially all of the iron is removed with practically no beryllium being extracted.

Equipment and methods commonly used in liquid-liquid extraction may be employed for the extraction of the iron. The alkylamine is generally intermixed in a water immiscible solvent or diluent prior to contacting it with the beryllium enriched solution. It is necessary for the diluent to be substantially immiscible with water and not reactive with the alkylamine or any of the constituents found in the aqueous leach solution. Diluents which may be used for the alkylphosphoric acid in the beryllium extraction generally may be used for the triisooctylamine. The alkylamine is generally dissolved in the inert diluents to give a solution or mixture containing from 5 to 20 weight percent of the alkylamine.

Generally two or so contact stages are used. A volume ratio of from 2 to 10 of the alkylamine mixture per volume of the aqueous leach solution is most often employed. In contacting the alkylamine mixture with the beryllium-containing solution, two phases are obtained, the aqueous phase and the organic alkylamine phase. The iron impurity from the aqueous phase is extracted from the beryllium-containing solution by the alkylamine into the organic phase. The phases settle readily and may be easily separated.

The iron from the iron-rich alkylamine or organic phase may be readily stripped by contacting the alkylamine phase with water. Substantially all of the iron can be removed by using a single stage contact and employing from 1 to 2 volumes of water per volume of the alkylamine solution. After the iron has been stripped from the mixture, the alkylamine solution may be recycled and used to contact more fresh aqueous acid leach solution.

If the beryllium is to be recovered as beryllium hydroxide, the beryllium-rich solution obtained from the alkylphosphate stripper or after contact with alkylamine will generally still contain some calcium which must be removed. This is accomplished by precipitation of the calcium. To the beryllium-rich solution a soluble oxalate or a sulfate is added to react with the calcium and thus form an insoluble precipitate. The pH of the solution is adjusted by the addition of a basic compound, such as an alkali metal hydroxide or an alkali metal carbonate or oxide, to give a pH in the range of 3.5 to 4. As the result, the calcium precipitates out as an insoluble salt. If a sulfate is used, iron present also precipitates out as iron hydroxide. Even though substantially all of the iron has been removed by the triisooctylamine step, a small amount of iron which may have remained or may have been picked up in the processing since the iron removal is thus removed. The resulting mixture is then filtered to remove the precipitated compounds. Upon the removal of the precipitated salts, the pH of the resulting filtrate is adjusted to a pH of 11 to 13. Alkali metal hydroxides or other alkali metal basic compounds, such as carbonates or oxides may be used. The pH adjusted solution is then heated to its boiling point resulting in the crystallization of beryllium as beryllium hydroxide, while aluminum and other impurities remain in solution. The beryllium hydroxide obtained can be then processed or converted to other salts as desired.

The following examples further illustrate the invention.

Example I

In a pilot plant process similar to that shown diagrammatically in the drawing, except that the fluoride is removed prior to the iron removal, 144 pounds per hour of an acid leach solution may be processed to recover 0.36 pound of beryllium hydroxide.

The acid leach solution in an amount of 144 pounds per hour is obtained by digesting a fluoride-bertrandite ore with hydrochloric acid. An acid leach solution in an amount of 144 pounds and having the following concentration is obtained.

| | Weight percent |
|---|---|
| $CaCl_2$ | 9.50 |
| $CaF_2$ | 1.44 |
| $AlCl_3$ | 0.78 |
| $BeCl_2$ | 0.50 |
| $FeCl_3$ | 0.68 |
| HCl | 0.18 |
| Others, about | .05 |
| $H_2O$ | 86.87 |

To this acid leach 45 pounds of a saturated potassium chloride solution is added. The acid leach solution contains sufficient amount of fluosilicate so that upon the addition of a potassium chloride 23 pounds per hour of potassium silicofluoride is precipitated. After filtering the potassium chloride treated solution, 146 pounds per hour of filtrate are obtained which has the following concentration.

| | Weight percent |
|---|---|
| $CaCl_2$ | 10.34 |
| $CaF_2$ | 0.70 |
| $AlCl_3$ | 0.77 |
| $BeCl_2$ | 0.49 |
| $FeCl_3$ | 0.67 |
| HCl | 0.20 |
| Other, about | .05 |
| $H_2O$ | 86.78 |

The silicofluoride-free solution is then contacted with a triisooctylamine solution in a two-stage mixer-settler extractor for the purpose of removing iron. The triisooctylamine is dissolved in toluene to form about a 7 weight percent solution of the amine in the toluene. About 350 pounds per hour of this solution is used to contact the 146 pounds of the aqueous acid leach solution. The iron-rich triisooctylamine solution thereby obtained is stripped of the iron by the use of water in an amount of about 205 pounds per hour in 4 countercurrent multistage contacts. The triisooctylamine solution, free of the iron, is recycled to the storage tank and then reused in the process.

To the iron-free acid leach solution, sufficient water and sodium hydroxide are added so that the total salt concentration in the extract is in the range of 6.2 weight percent and the pH is 2. This gives a total of 293 pounds of solution per hour. The pH adjusted solution is then contacted with approximately 152 pounds of a 16.7 weight percent solution of monododecylphosphoric acid in kerosene. A four countercurrent multistage contact is used. The dodecylphosphoric acid phase in an amount of approximately 152 pounds is obtained and has the following concentration.

| | Weight percent |
|---|---|
| Al | 0.06 |
| Be | 0.05 |
| Ca | 0.04 |
| Dodecylphosphoric acid | 16.50 |
| Kerosene | 83.35 |

The aqueous solution in an amount of about 293 pounds substantially free of beryllium is discharged to waste and has the following concentrations:

| | Weight percent |
|---|---|
| $CaCl_2$ | 5.10 |
| $CaF_2$ | 0.35 |
| $AlCl_3$ | 0.23 |
| $BeCl_2$ | 0.005 |
| HCl | 0.465 |
| $H_2O$ | 93.85 |
| Other chlorides | Remainder |

The beryllium rich dodecylphosphoric acid solution is then stripped in a three countercurrent multistage contact using 6 pounds per hour of a 32 percent hydrochloric acid solution. The dodecylphosphoric acid solution free of beryllium is recycled to be contacted with more iron-free aqueous acid leach solution.

Upon stripping of the dodecylphosphoric acid solution approximately 6.3 pounds per hour of a beryllium concentrated acid solution is obtained having the following concentration:

| | Weight percent |
|---|---|
| $CaCl_2$ | 2.68 |
| $AlCl_3$ | 7.16 |
| $BeCl_2$ | 11.25 |
| HCl | 11.82 |
| $H_2O$ | 67.09 |

Similar results are obtained when di(2-ethylhexyl) phosphoric acid, monoheptadecylphosphoric acid, and mono-2-ethylhexyl phosphoric acid are used in place of monododecyl phosphoric acid.

To this 6.3 pounds of solution, 3.7 pounds per hour of a 6 weight percent of sodium oxalate with 1.7 pounds per hour of a fifty weight percent sodium hydroxide solution are added. By the addition of the sodium hydroxide, the pH of the solution is adjusted to a pH of 3.5 resulting in the precipitation of the small amounts of iron hydroxide which remained or had been picked up in the processing and the calcium as calcium oxalate. The slurry or mixture is filtered to remove the small amount of iron and the calcium. To the resulting filtrate 3.6 pounds of a 50 weight percent solution of sodium hydroxide are added to adjust the pH of the filtrate to 12. After the pH is adjusted to 12, 13 pounds of a solution are obtained having the following concentration.

| | Weight percent |
|---|---|
| $NaAlO_2$ | 2.07 |
| $Na_2BeO_2$ | 5.83 |
| NaCl | 22.87 |
| $H_2O$ | 69.23 |

Upon boiling the alkaline solution, the sodium beryllate decomposes and beryllium hydroxide is obtained. The boiled solution is then centrifuged giving about 0.36 pound per hour of beryllium hydroxide and a filtrate which has the following composition.

| Filtrate: | Weight percent |
|---|---|
| $NaAlO_2$ | 2.11 |
| NaCl | 23.36 |
| NaOH | 5.48 |
| $H_2O$ | 69.05 |

*Example II*

To show the exceptional extraction properties of triisooctylamine in removal of iron, a leach solution obtained upon the hydrochloric acid digestion of a bertrandite ore containing fluorides was used. The solution had the following concentrations:

| Elements: | Grams per liter |
|---|---|
| Al | 4.16 |
| Be | 2.43 |
| Ca | 14.6 |
| Fe | 2.70 |
| Si | 0.4 |
| Cl | 0.107 |
| F | 15 |
| H | 1.4 |

The solution was placed in a mechanical shaker with a 7 weight percent toluene solution of triisooctylamine and shaken for 1 hour. The ratio of the triisooctylamine solution to the aqueous solution used was 6.6:1. After the solutions had been shaken for one hour, the two phases were separated and each phase analyzed for iron and beryllium. The iron in grams per liter in the organic phase was 0.40 and 0.002 in the aqueous phase. The beryllium content in the organic phase was nil. The percent of the total iron remaining in the aqueous phase after the extraction was 0.1.

The iron-containing triisooctylamine solution obtained was stripped of the iron by using three water contacts of approximately ½ volume of water per volume of the organic solution in each contact. In each contact the triisooctylamine solution was contacted with the water for about 15 to 30 minutes. A 100 percent removal of the iron was obtained.

The run of the triisooctylamine extraction was repeated using more of the same acid leach solution except that the pH of the solution was adjusted to a pH of 2. In analyzing the organic and the resulting aqueous phase for iron, it was found that the organic phase contained 0.46 gram per liter of iron while no iron could be detected in the aqueous solution.

The above run was repeated except that in place of the triisooctylamine, didodecylamine was used. The solution was adjusted to a pH of 2. With the didodecylamine as a solvent 67 percent of the iron in the aqueous solution was extracted in one stage.

What is claimed is:

1. In a process for the separation and recovery of beryllium values from an acidic aqueous leach solution of beryllium ore, the improvement in removing the iron impurities from the solution, which comprises contacting the acidic aqueous leach solution with triisooctylamine in a water immiscible diluent to extract the iron values from the acidic aqueous solution.

2. In a process for the separation and recovery of beryllium from an aqueous leach solution of beryllium ore containing fluoride ions, the improvement which comprises reacting the free-fluoride anions in the aqueous leach solution with a compound selected from the group consisting of aluminum salts, soluble silicate salts and oxygen-containing boron salts to thereby obtain the fluoride ions in a combined form, adding an alkali metal basic compound to the resulting solution until the pH of the solution is in the range of 1 to 5, diluting the solution until the salt concentration in the solution is less than 20 weight percent, contacting the pH adjusted and diluted aqueous solution with a mixture of an alkylphosphoric acid selected from the group of mono- and dialkylphosphoric acids having alkyl substituents of from 5 to 19 carbon atoms in an inert water immiscible diluent to extract the beryllium in a resulting organic alkylphosphoric acid phase, separating the organic alkylphosphoric phase containing the beryllium from the remaining aqueous solution, contacting the alkylphosphoric acid organic phase with a mineral acid to strip the beryllium from the alkylphosphoric acid and to thereby obtain an acid solution containing an increased concentration of beryllium and recovering the beryllium from the solution.

3. A process according to claim 2 wherein the basic compound is added to the solution until the pH is in the range of 1.8 to 3 and the solution is diluted to a salt concentration of from 0.5 to 5 weight percent.

4. A process according to claim 3 wherein the alkylphosphoric acid is monododecylphosphoric acid.

5. A process according to claim 3 wherein the alkylphosphoric acid is di(2-ethylhexyl)phosphoric acid.

6. A process according to claim 3 wherein the alkylphosphoric acid is mono(2-ethylhexyl)phosphoric acid.

7. A process according to claim 3 wherein the alkylphosphoric acid is didodecylphosphoric acid.

8. In a process for the separation and recovery of beryllium from an aqueous leach solution of beryllium ore containing fluoride ions, the improvement which comprises reacting the free fluoride anions in the aqueous leach solution with a compound selected from the group consisting of aluminum salts, soluble silicate salts and oxygen-containing boron salts to thereby obtain the fluoride ions in a combined form, adding an alkali metal basic compound to the resulting solution until the pH of the solution is in the range of 1 to 5, diluting the solution until the salt concentration in the solution is less than 20 weight percent, contacting the pH adjusted and diluted aqueous solution with a mixture of an alkylphosphoric acid selected from the group of mono- and dialkylphosphoric acids having alkyl substituents of from 5 to 19 carbon atoms in an inert water immiscible diluent to extract the beryllium in a resulting organic alkylphosphoric acid phase, separating the organic alkylphosphoric phase containing the beryllium from the remaining aqueous solution, contacting the alkylphosphoric acid organic phase with a mineral acid to strip the beryllium from the alkylphosphoric acid and to thereby obtain an acid solution containing an increased concentration of beryllium, contacting the beryllium enriched solution with an alkylamine selected from the group consisting of di- and trialkylamines having alkyl substituents of from 5 to 19 carbon atoms in a water immiscible diluent to extract iron from the solution, and recovering the beryllium from the iron-free solution containing the increased concentration of beryllium.

9. A process according to claim 8 wherein an alkali metal hydroxide is added to the solution until the pH is in the range of 1.8 to 3 and the solution is diluted to a salt concentration of from 0.5 to 5 weight percent.

10. A process according to claim 9 wherein the alkylphosphoric acid is monododecylphosphoric acid and the alkylamine is triisooctylamine.

11. A process according to claim 9 wherein the alkylphosphoric acid is di(2-ethylhexyl)phosphoric acid and the alkylamine is triisooctylamine.

12. A process according to claim 9 wherein the alkylphosphoric acid is mono(2-ethylhexyl)phosphoric acid and the alkylamine is triisooctylamine.

13. A process according to claim 9 wherein the alkylphosphoric acid is didodecylphosphoric acid and the alkylamine is triisooctylamine.

14. A process for the separation and recovery of beryllium from an aqueous leach solution of beryllium ore containing impurities, which comprises adding a soluble potassium salt and an aluminum salt to the aqueous solution to convert silicofluoride ions in the solution to a potassium silicofluoride precipitate and to convert the fluoride ions to fluoro-aluminum ions, separating the potassium silicofluoride from the solution, adding an alkali metal basic compound and water to the remaining iron-free solution until the pH of the solution is in the range of 1 to 5 and the total dissolved salt content of the solution is less than 20 weight percent, contacting the pH adjusted and diluted aqueous solution with a mixture of an alkylphosphoric acid selected from the group of mono- and dialkylphosphoric acids having alkyl substituents of from 5 to 19 carbon atoms in a water immiscible organic diluent to extract the beryllium and to obtain an organic alkylphosphoric acid phase, separating the alkylphosphoric acid phase containing the beryllium from the remaining aqueous solution, contacting the alkylphosphoric acid organic phase with a 4 to 12 normal hydrochloric acid solution to strip the beryllium from the organic phase and to thereby obtain an acid solution containing an increased concentration of beryllium, contacting the beryllium-rich solution with an alkylamine selected from the group consisting of di- and trialkylamines having alkyl substituents of from 5 to 19 carbon atoms in a water immiscible diluent to extract the iron impurities from the solution, adding a soluble salt selected from the group consisting of soluble oxalate and sulfate salts to the resulting iron-free solution, adding an alkali metal basic compound to the acid solution containing the soluble salt to adjust the pH to a pH of from 3.5 to 4 to precipitate the calcium in the acid solution as an insoluble salt, removing the precipitated calcium salt, adding an alkali metal basic compound to the solution free of calcium until the pH is in the range of 11 to 13, heating the pH adjusted solution to precipitate the beryllium as beryllium hydroxide, and recovering the beryllium hydroxide.

15. A process according to claim 14 wherein the alkali metal basic compound is an alkali metal hydroxide and is added to the solution until the pH is in the range of 1.8 to 3 and the solution is diluted to a salt concentration of from 0.5 to 5 weight percent, prior to extraction with the alkyl phosphate.

16. In a process for the separation and recovery of beryllium values from an aqueous acidic leach solution of beryllium ore, the improvement in removing the iron impurities from said acidic solution which comprises contacting said aqueous acidic leach solution with triisooctylamine in toluene thereby to extract the iron values from the aqueous acidic solution.

References Cited in the file of this patent

UNITED STATES PATENTS

| | | |
|---|---|---|
| 2,399,178 | Furlaud | Apr. 30, 1946 |
| 2,899,276 | Hutter | Aug. 11, 1959 |
| 2,974,011 | Riabovol | Mar. 7, 1961 |